United States Patent [19]

Gagnon

[11] Patent Number: 5,433,308
[45] Date of Patent: Jul. 18, 1995

[54] ROLLER ASSEMBLY AND METHOD FOR MANUFACTURING THE SAME

[75] Inventor: Jean-Pierre Gagnon, Quebec, Canada

[73] Assignee: J.P.G. Composite Plus Inc., Quebec, Canada

[21] Appl. No.: 266,834

[22] Filed: Jun. 28, 1994

[51] Int. Cl.⁶ .............................................. B65G 13/00
[52] U.S. Cl. ...................................................... 193/37
[58] Field of Search .................... 198/780; 193/37; 277/53, 56; 384/144, 147, 480, 484

[56] References Cited

U.S. PATENT DOCUMENTS

| | | | |
|---|---|---|---|
| 1,958,412 | 5/1934 | Andrada et al. | 308/187 |
| 3,287,069 | 11/1966 | Jonik | 308/20 |
| 3,610,387 | 10/1971 | Stein | 193/37 |
| 3,841,721 | 10/1974 | Coutant et al. | 308/20 |
| 3,944,055 | 3/1976 | Stumpf | 198/127 |
| 3,984,160 | 10/1976 | Sheldon et al. | 308/187.1 |
| 4,028,786 | 6/1977 | Dempster | 29/132 |
| 4,036,345 | 7/1977 | Webb | 193/35 SS |
| 4,093,324 | 6/1978 | Carrigan | 308/187.1 |
| 4,097,095 | 6/1978 | Zimmer | 308/20 |
| 4,101,180 | 7/1978 | Anderson et al. | 308/20 |
| 4,139,203 | 2/1979 | Garrison | 277/56 |
| 4,174,031 | 11/1979 | MacLeod | 198/501 |
| 4,213,523 | 7/1980 | Frost et al. | 193/37 |
| 4,277,114 | 7/1981 | Lindegger | 308/20 |
| 4,312,444 | 1/1982 | Mushovic | 198/780 |
| 4,344,218 | 8/1982 | Hooper et al. | 29/516 |
| 4,372,246 | 2/1983 | Azar et al. | 118/60 |
| 4,440,295 | 4/1984 | Blackwood-Murray et al. | 198/843 |
| 4,441,601 | 4/1984 | Rood | 193/37 |
| 4,557,490 | 12/1985 | Tavares | 277/80 |
| 4,642,862 | 2/1987 | Muhle et al. | 29/132 |
| 4,645,071 | 2/1987 | Faulkner et al. | 198/842 |
| 4,668,110 | 5/1987 | Egeto et al. | 193/37 X |
| 4,793,459 | 12/1988 | Forknall et al. | 193/37 |
| 4,955,462 | 9/1990 | Bilodeau et al. | 198/37 |
| 5,025,917 | 6/1991 | Smith et al. | 198/842 |
| 5,064,406 | 11/1991 | Schutte | 474/166 |
| 5,221,095 | 6/1993 | Orlowski | 277/1 |
| 5,238,166 | 8/1993 | Schwarstein et al. | 277/53 |
| 5,261,528 | 11/1993 | Bouchal | 198/842 |

FOREIGN PATENT DOCUMENTS

| | | | |
|---|---|---|---|
| 1187030 | 5/1985 | Canada | B65G 39/00 |
| 1208000 | 2/1960 | France . | |
| 1317672 | 7/1964 | France . | |
| 2723808 | 11/1978 | Germany . | |
| 3027157 | 2/1982 | Germany . | |
| 1147911 | 4/1969 | United Kingdom | F16C 13/00 |
| 1591194 | 6/1981 | United Kingdom | B65G 39/09 |
| 2165920 | 4/1986 | United Kingdom | F16C 13/00 |
| 275833 | 10/1970 | U.S.S.R. | B65G 39/02 |
| 1516426 | 10/1989 | U.S.S.R. | 193/37 |

OTHER PUBLICATIONS

Database Search made in Mar. 1990.
Publication: Enduride Super Roll by Le Composite-Avant-Garde Inc. of Saint-Jean-sur-Richelieu, Québec, Canada.

*Primary Examiner*—James R. Bidwell
*Attorney, Agent, or Firm*—Edwin E. Greigg; Ronald E. Greigg

[57] ABSTRACT

Disclosed is a roller assembly of the type comprising a roller body provided with opposed ends, a shaft, a bearing having an inner portion and an outer portion and a casing for housing the bearing and a portion of the shaft. The casing has an exterior contacting a corresponding portion of the interior of the roller body and an interior contacting the outer portion of the bearing. The second part of the roller assembly is made of a cured material filling a gap existing between the exterior of the first part of the casing and the interior of the roller body. The material has been introduced in said gap in a fluid state and cured "in situ" without any shrinkage. The roller body according to the invention is more resistant and easier to manufacture. Also disclosed is an efficient method for manufacturing the roller assembly.

32 Claims, 6 Drawing Sheets

ROLLER ASSEMBLY AND METHOD FOR MANUFACTURING THE SAME

BACKGROUND OF THE INVENTION

1. FIELD OF THE INVENTION

The present invention relates to a roller assembly to be used, for example, as a conveyor roller. The invention also relates to a method for manufacturing a such roller assembly.

2. DESCRIPTION OF THE PRIOR ART

Usually, roller assemblies comprise a cylindrical tube which rotates on a shaft by means of bearings. U.S. Pat. No. 4,642,862 discloses a stone roller for a paper making machine provided with a shaft and two opposite ends. At each end, plates are provided and clamped with tie-rods extending all along the inner wall of the roller body. The tie-rods are fixed to the plates and sealed with a resin. The resin is used only as sealing and protective means.

The main problem arising with a conventional roller assembly is the damagement of bearings due to exterior contaminents and/or to vibrations.

Aforesaid bearings may be protected from exterior contaminents (such as dust particles) by sealing means such as labyrinth seals disclosed in U.S. Pat. No. 4,955,462. Also, U.S. Pat. No. 5,025,217, No. 5,261,528 and No. 3,944,055 disclose roller assemblies provided with bearings means and labyrinth seals. In these patents, the size of the roller body and the size of the other elements are very closely interdependent. Indeed, each of the element has to be precisely tooled to obtain a roller assembly of a predetermined size. Moreover, materials used in the manufacturing of these elements must have a sufficient compression resistance to allow a press fit assembling. Of course, this restricts the choice of materials which can be used for manufacturing rollers assemblies.

None of the roller assemblies of the prior art can be simultaneously long lasting, resistant to contaminents and/or vibration, and very easy and inexpensive to manufacture. Therefore, there is a very strong need for roller assemblies that can simultaneously have the aforesaid characteristics.

SUMMARY OF THE INVENTION

An object of the present invention is to provide a roller assembly that is very easy and inexpensive to manufacture, long lasting, resistant to contaminents and/or vibration.

Another object of the present invention is to provide a roller assembly where it is not necessary to machine all the parts of the assembly and press fit them one against the other.

Another object of the present invention is to provide a roller assembly where at least part of the manufacturing can be made by unskilled workman.

Another object of the present invention is to provide a simple and inexpensive method for the manufacturing of a roller assembly according to the invention.

Another object of the present invention is to embody a roller assembly where a roller body is mounted on a shaft provided with bearing means with a casing comprising two coaxial parts, that is a first part assembled on the shaft and a second part cast between said first part and an interior of the roller body, said second part being cured "in situ".

Another object of the present invention is to obtain a roller assembly where the roller body and the other constitutive members of roller assembly have no need to be manufactured with a high degree of precision, the cohesion of the apparatus being obtained by a cured material contained in the gap existing between the exterior of the outer part of the bearing device and the interior of a roller body. Of course, the material is introduced in said gap in a fluid state and cured "in situ" without any shrinkage.

Another object of the invention is to obtain a roller assembly where compression resistance to bring up constituting members of the assembly can be lower and the choice of usable material to embody the invention is substantially increased. Advantageously, any roller body having an inner diameter higher than the outer diameter of the first part of the casing may be used.

An object of the present invention relates to an improvement in a roller assembly of the type comprising:

a roller body provided with opposed ends and with an interior;

a shaft having an outer surface;

bearing means comprising at least one bearing device having an inner portion and an outer portion and having its inner portion coaxially mounted on the surface of the shaft; and a casing having an exterior contacting a corresponding portion of the interior of the roller body and an interior contacting the outer portion of the corresponding bearing device.

The casing comprises at least two coaxial parts (preferably a first part and a second part).

The first part has an interior and an exterior. The interior of the first part defines at least a portion of the interior of the casing and contacts the outer portion of the bearing means but substantially not the shaft. The exterior of said first part has at least a portion thereof defining at least a portion of the exterior of the casing and contacting the interior of the roller body. The second part has also an interior and an exterior. The interior of the second part contacts either a corresponding portion of the outer portion of the corresponding bearing device or a corresponding portion of the exterior of the first part.

The improvement to the aforesaid roller assembly is that the second part of the casing is made of a cured material contained in a gap existing between the outer portion of at least one corresponding bearing device on the first part of the casing, and the interior of the roller body. More particularly, the second part of the casing is obtained "in situ" from a material in fluid state introduced in said gap and cured "in situ" without any shrinkage.

According to a preferred embodiment, the interior of the second part contacts the exterior of the first part of the casing.

According to another preferred embodiment, the interior of the second part of the casing contacts the exterior of the first part of the casing and contacts the outer portion of at least one corresponding bearing device.

A man skilled in the art may select the material to be cured amongst absorbing materials and thus further define absorbing means that may further protect the roller assembly against vibrations that may cause damage the bearings devices. Therefore, another particularly preferred object of the invention is to obtain a roller assembly further improved by providing absorbing means between the bearing device, preferably a portion of the exterior of the casing, and a portion of the roller body. Such an embodiment substantially increase the resistance and usefull life of a roller assembly according to the invention.

The invention also relates to a method for manufacturing such roller assembly. According to the invention the following steps are carried out:

—pouring the curable material in fluid state in the gap existing between the outer portion of at least one bearing device and the interior of the roller body;

—curing the material until obtaining the second part of the casing. This method is easy and efficient to produce roller assemblies according to the invention.

BRIEF DESCRIPTION OF THE DRAWINGS

Other objects and advantages of the invention will be better understood in by the following description of fourth preferred embodiments with reference to the appended drawings in which.

DETAILED DESCRIPTION OF THE PREFERRED EMBODIMENTS

Figure 1:
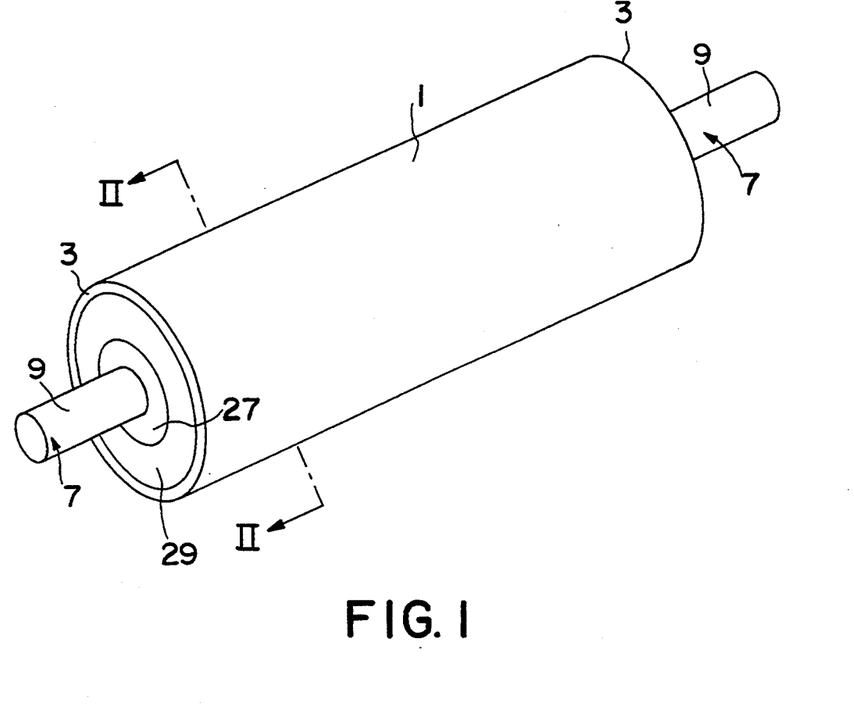
FIG. 1 is a perspective view of a first preferred embodiment of a roller assembly according to the invention.

In order to make easier the reading of the followings description of preferred embodiments of the invention and because all the embodiment illustrated in FIGS. 1 to 6 have a plurality of similar structural parts, identical but incremented reference numbers were used. Thus, for example, the shaft 7 appearing on FIG. 1 is numbered 107 on FIG. 3, 207 on FIG. 5 and 307 on FIG. 6.

Figure 2:
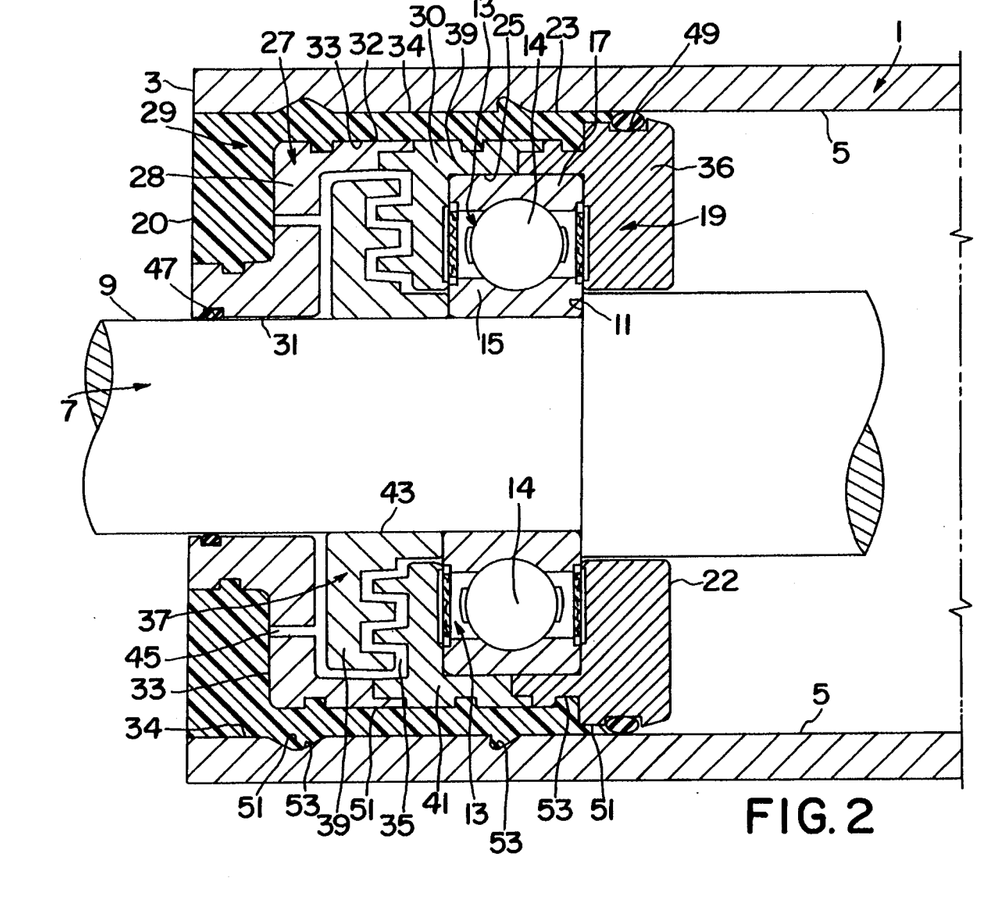
FIG. 2 is a partial cross-sectional and longitudinal view according to line II—II of the roller assembly of FIG. 1.

The roller assembly shown in FIGS. 1 and 2 has a roller tube 1, a shaft 7 having an outer surface 9, bearing means and a casing 19. The roller tube 1 may rotate about the shaft 7 by means of bearings. The roller tube 1 is provided with opposed ends 3 and with an interior 5. The bearing means comprise two bearing devices 13 respectively provided near each of the ends 3 of the roller tube 1 and each having an inner portion 15 and an outer portion 17.

The casing 19 houses a corresponding bearing device 13 and a corresponding portion of the shaft 7. The casing 19 has also an exterior 23 contacting a corresponding portion of the interior 5 of the roller tube 1 and an interior 25 contacting the outer portion 17 of the bearing device 13. The casing 19 also comprises at least two coaxial parts, that is a first part 27 and a second part 29.

The first part 27 has an interior 31 and an exterior 32. The interior 31 of the first part 27 defines at least a portion of the interior 25 of the casing 19 and contacts the outer portion 17 of the bearing device 13 and substantially not contact the shaft 7.

The second part 29 has an interior 33 and an exterior 34. This interior 33 of the second part 29 contacts the exterior 32 of the first part 27. The exterior 34 of the second part 29, defining at least a portion of the exterior 23 of the casing 19, contact the interior 5 of the roller tube 1.

The improvement is the second part 29 is made of a cured material filling a gap existing between the exterior 32 of the first part 27 of the casing 19 and the interior 5 of the roller tube 1, said material having been introduced in said gap in a fluid state and cured "in situ" without any shrinkage for said cured material. According to a particularly preferred embodiment of the invention, the cured material may swell to thus apply a pressure against the exterior 32 of the second part 29 and the interior 5.

A particularly preferred embodiments illustrated in FIGS. 1 and 2 also comprise means for protecting the bearing device 13 from exterior contaminents. Such protecting means may be provided between the bearing device 13 and its corresponding end 3 of the roller tube 1.

These protecting means for the bearing device 13 are housed inside the casing 19, once mounted on the shaft 7. They may comprise a labyrinth seal 37 having a first and a second parts respectively 39 and 41. The first part 39 is provided with an interior 43 contacting the shaft 7 and eventually, as illustrated, contacting said bearing device 13. The second part 41 define a part of the first part 27 of the casing 19.

The first part 27 of the casing may advantageously comprise, as illustrated in FIG. 2, a first member 28, a second member 30 and a third member 36. The first member 28 is positioned toward the closer end 3 of the roller tube 1. The second member 30 is positioned between the first member 28 and the third member 36. Furthermore, according to a particularly preferred embodiment of the invention illustrated in FIG. 2 of the drawings, the second member 30 may be part of the second part 41 of the labyrinth seal 37.

A first "O"-ring 47 may be positioned near a end 20 of the casing 19 which is located near the end of the roller tube 1 and simultaneously contact the interior 31 of the first part 27 of the casing 19 and the outer surface 9 of the shaft 7.

A second "O"-ring 49 may also be positioned near the opposite end 22 of the casing 19. This "O"-ring 49 is part of the exterior 32 of the first part 27 of the casing 19 and contacts the interior 5 of the roller tube 1.

Moreover a fluid packing 35 is provided between the first and the second parts (39 and 41) of the labyrinth seal 37. Such protecting means are highly efficient to avoid the damaging of bearing due to the action of foreign particles. It may also be convient to provide a channel 45 which allows a fluid communication between the labyrinth seal 37 and the outside of the casing 19. That particular embodiment promote a very simple method to verify if enough packing fluid have been provided between the two parts (39 and 41) of the labyrinth seal 37. In fact, the packing fluid is provided in a slight excess which can come out by the outer channel 45. The presence of this excess of fluid packing 35 at the end of the roller assembly indicates a correct packing of the labyrinth seal 37. The excess of fluid packing 35 having flow through the channel 45 is simply removed by any appropriate means such as wiping.

Optionally, protecting means may further comprise the "O"-ring 47 which contacts the shaft 7 and the exterior 31 of the first part 27 of the casing 19, near the end 3 of the roller tube 1. According to this embodiment, the path trough which contaminants must travel to reach the bearing means is further restricted.

The materials filling the gap between the roller body 1 and the first part 27 of the casing 19 is advantageously cured by a vulcanization process. It is required that the selected material does not shrink during its curing. Optionally, it is advantageous to use a material that can swell during its curing. This optional embodiment may improve the solidity of the assembly.

To embody a very resistant roller assembly, absorbing means may be further provided. Those means comprise the second part 29 of the casing 19. Here, the selection of the material to be cured is made amongst material well known to a man skilled in the art. Advantageously, the materials may be selected amongt those having suitable coefficient of swelling and/or hardening to defining a roller assembly having specific characteristics. It is to be noted that it is known in the art to control the characteristics of roller assembly by an appropriate selection of the hardening characteristic of its constitutive part. However, the present invention substantially enlarge the list of material usable because at least a part of the roller is cast and cured "in situ", said part being made with a material having a large scope of characteristics.

Advantageously the roller assembly comprises at least one bearing device 13. This bearing device 13 has an outer portion 17 provided with an outer surface facing a corresponding portion of the interior 5 of the roller tube 1. Moreover, absorbing means which comprise at least a portion of the second part 29 of the casing 19 are advantageously positioned between the outer surface 17 of the bearing device 13 and the corresponding portion of the interior 5 of the roller tube 1. This specific positioning of said absorbing means between the bearing device 13 and the roller tube 1 improve the strength of the whole the roller assembly.

It is also advantageous that each bearing device 13 be laterally abutted on a shoulder 11 provided on the shaft 7.

To improve the adhesion of the cured material, it is advantageous to provide means for mechanically engaging the second part 29 of the casing 19 on, at least, the exterior 32 of the first part 27 of the casing 19, the interior 5 of the roller tube 1 or, at once, the exterior 34 of the second part 29 of the casing 19 and the interior 5 of the roller tube 1. Said means for promoting a such mechanically engagement may be of the type of a tongue and groove assembly. For example in the first preferred embodiment shown in FIGS. 1 and 2, tongues 51 and grooves 53 may be provided on both the interior 5 of the roller tube 1 and the exterior 32 of the first part 27 of the casing 19.

According to a particularly preferred embodiment of the invention illustrated in FIGS. 1 and 2, each bearing device 13 may advantageously consist of a roller bearing 14 having an inner race defining the inner portion 15 of the bearing device 13 and an outer race defining the outer portion 17 of the bearing device 13. These kind of bearing means are very commonly use in the manufacture of roller assembly, and do not require any further extensive description.

Figure 3:
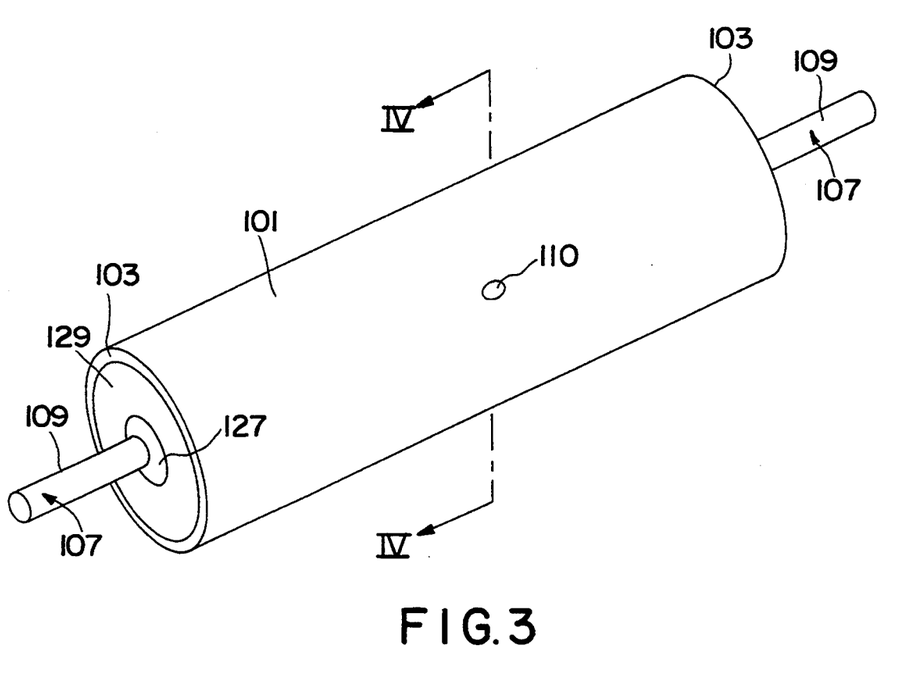
FIG. 3 is a perspective view of a second preferred embodiment of a roller assembly according to the invention.
Figure 4:
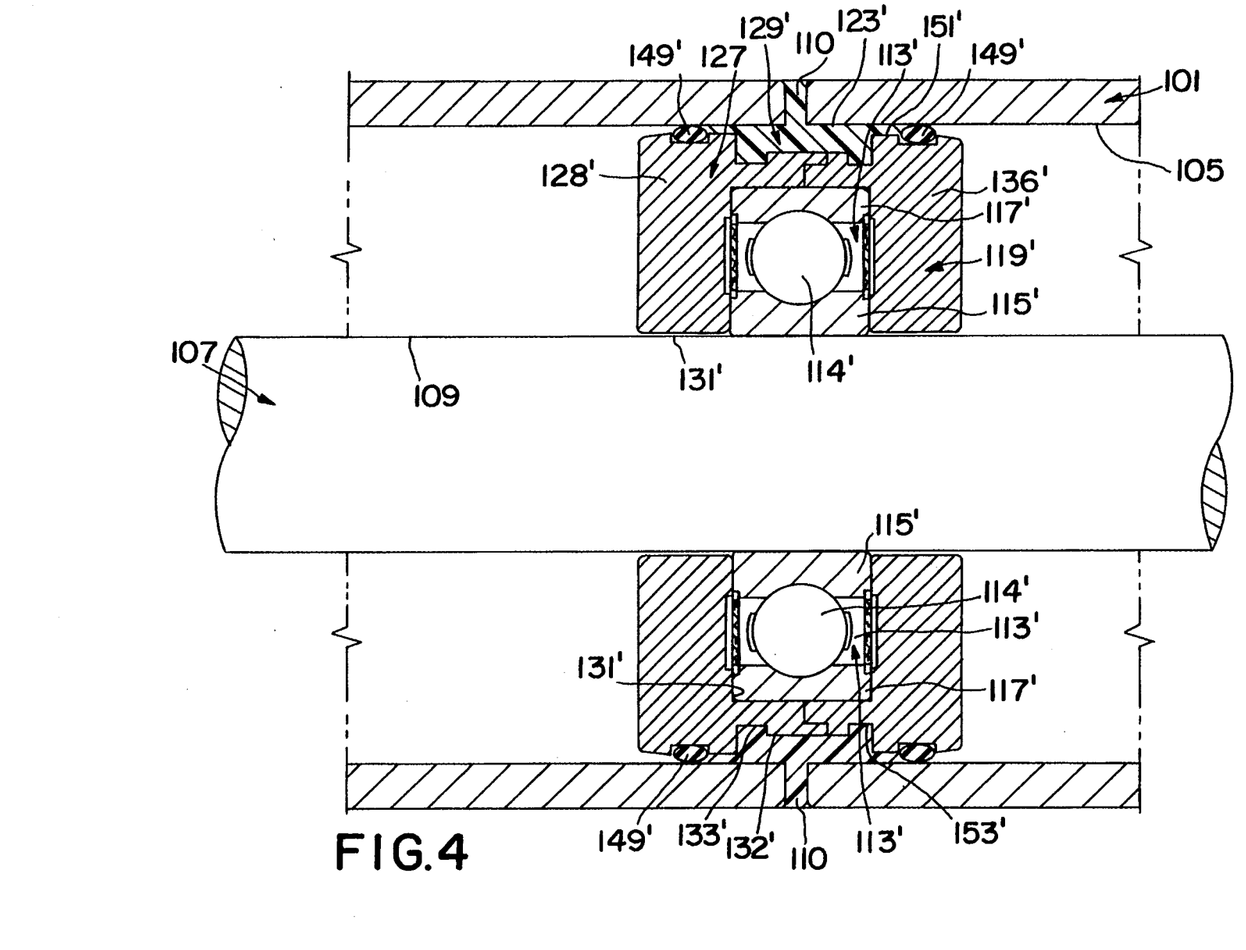
FIG. 4 is a partial cross-sectional and longitudinal view according to line IV—IV of the roller assembly of FIG. 3.

Referring now to FIGS. 3 and 4, there is illustrated a second particularly preferred embodiment of the invention. In this second preferred embodiment it is to be noted that it differs from the one described with reference to FIGS. 1 and 2 only by the fact that at least one additional casing 119' is positioned in the roller tube. Therefore, in order to avoid redundancy of the disclosure, the roller tube, the casing, the shaft and any parts, members or constituants thereof have received the same reference number than those already used in FIGS. 1 and 2 except they have been incremented by one hundred. For example, the shaft 7 in FIGS. 1 and 2 is now the shaft 107 in FIGS. 3 and 4. It is to be noted that as illustrated, advantageously no labyrinth seal was provided for the casing 119' located inside the roller tube 101.

More particularly, the casing 119' comprise two identical members 128' similar to the member 136 and two "O"-rings 149 (each provided on a corresponding member 128'). For the casing 119', all parts similar to those of the casing 19 have kept their corresponding reference numbers with in addition a prime sign (i.e. ""'"). Also, at least one opening 110 is advantageously provided in the roller tube 101 to allow a fluid communication with the gap existing between the first part of the casing 119' and the interior 105 of the roller tube 101. This opening 110 is intended to allow the curable material in fluid state to be introduced in said gap. Also, after curing of the material, it may further contribute to define means allowing to fasten the second part 129' of the casing 119' with the roller tube 101. These fastening means are similar to a tongue and groove assembly.

A roller assembly having intermediary bearing means is useful when a roller having substantial length is to be used. This use of intermediary roller is well known in the art. The purpose of the above description was only to show that it was possible to embody it within the field of the present invention.

Figure 5:
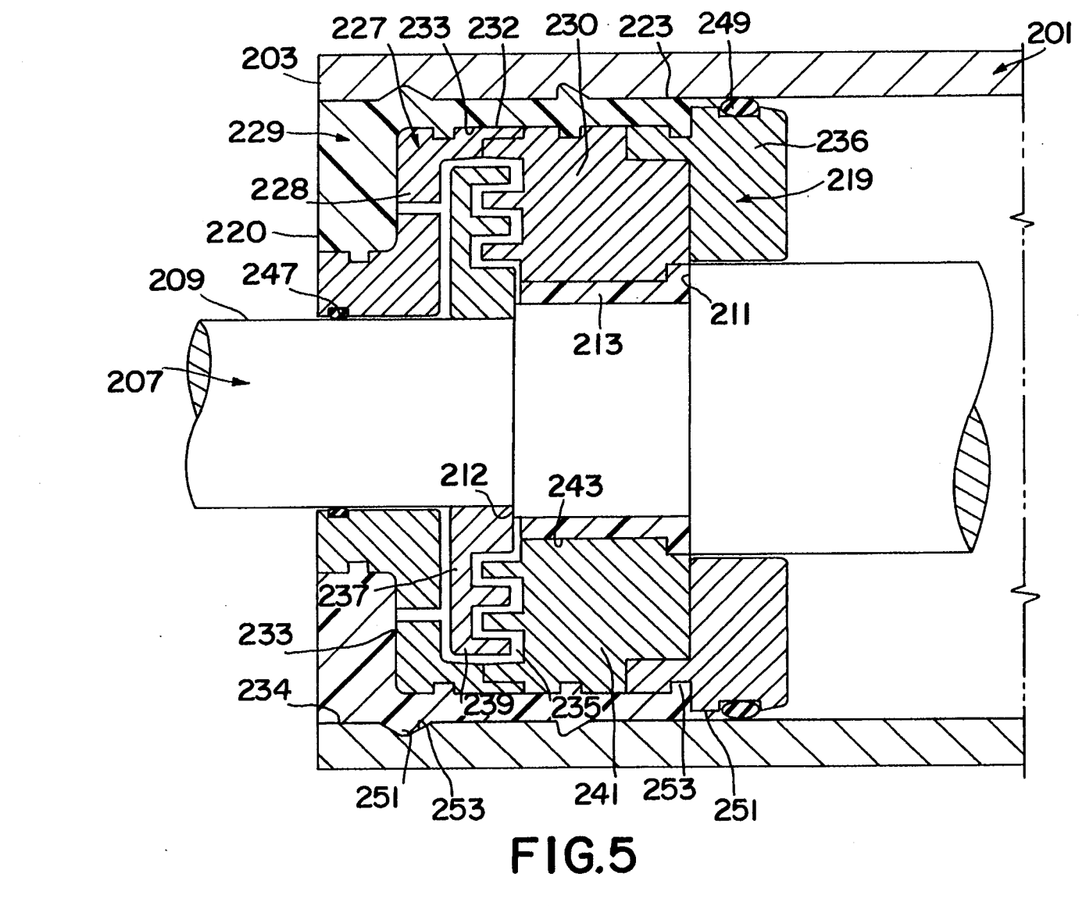
FIG. 5 is a partial cross-sectional and longitudinal view of a roller assembly according to a third preferred embodiment of the invention.

Referring now to a third particularly preferred embodiment of the invention illustrated in FIG. 5 of the drawings, it is to be noted that it differs from the one illustrated in FIGS. 1 and 2 only by the fact that the roller device 13 is replaced by a sleeve 213. This sleeve 213 (also called bushing) are made of antifriction material, such as TEFLON (trademark).

Such bearings 213 are commonly use in the manufacture of roller assemblies and well known by anyone skilled in the art.

Optionally, the shaft 207 may further be provided with another shoulder 212 against which the labyrinth seal 237 may be laterally abutted. This particular disposition allows an easy positioning of at least a part of the protecting means 213.

Figure 6:
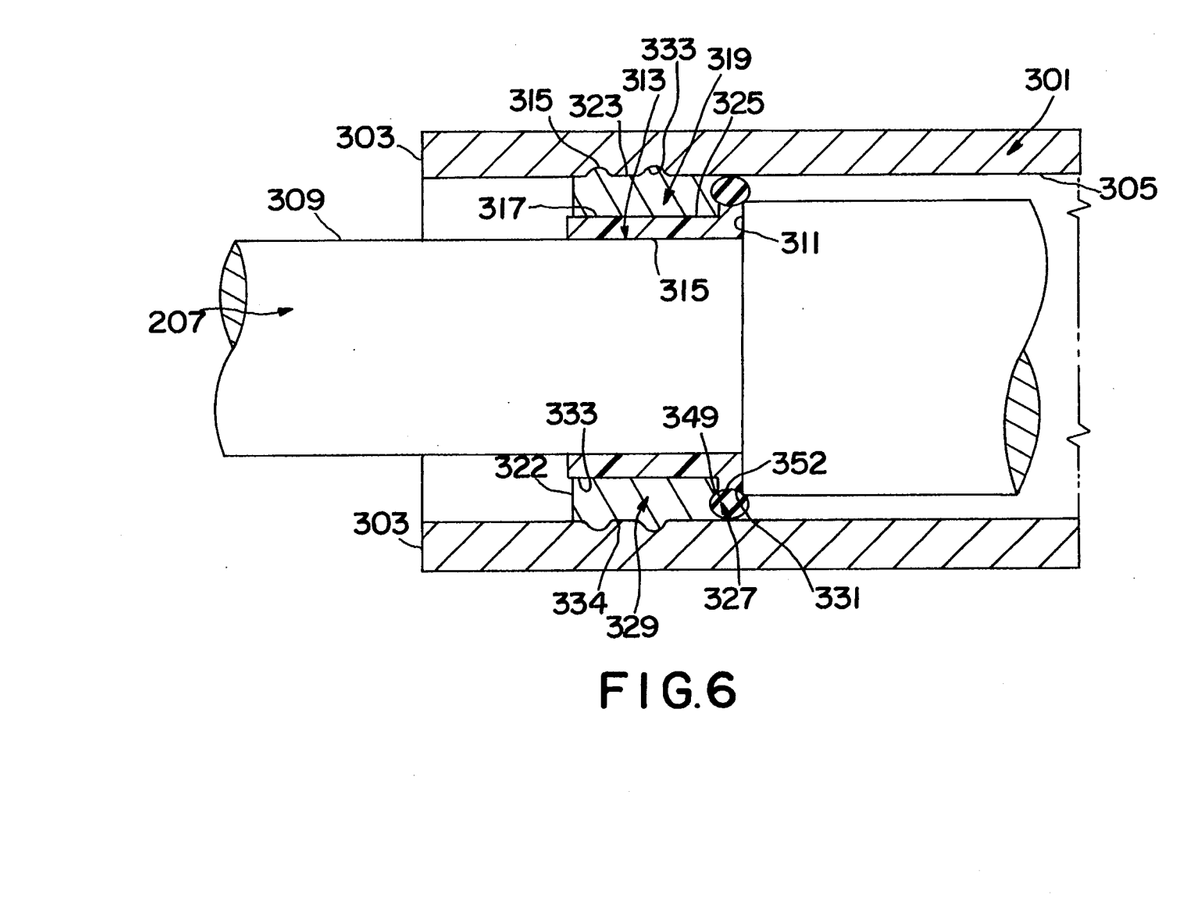
FIG. 6 is a partial cross-sectional and longitudinal view of another variant of a roller assembly according to a fourth preferred embodiment of the invention.

A fourth embodiment of the invention is illustrated on FIG. 6 of the drawings. In this particular roller assembly the interior 333 of the second part 329 of the casing 319 contacts the outer portion 317 of the bearing device and the exterior 334 of the second part 329 contacts the interior 305 of the roller tube 301. The bearing device may comprise a sleeve similar to the sleeve 213 provided on the third preferred embodiment. However, in order to facilitate the positioning of the interior 351 of the first part 327 of the casing 319 a portion of the outer portion 317 of the sleeve 313 may optionally present a substantially circular depression 352 as illustrated on FIG. 6. As also shown on FIG. 6 this first part 327 is advantageously an "O-ring" and no protecting means may be provided. Such a roller assembly according to this particular embodiment allows to obtain a low manufacturing price per unit.

The invention also relates to methods of manufacture of the above mentioned roller assemblies. More particularly, this method comprises the steps of:

—pouring a curable material in fluid state in a gap existing between the outer portion (17, 117, 117', 217 or 317) of at least one corresponding bearing device (13, 113,113', 213,313) and the interior (5,105, 205 or 305) of the roller body (1,101,201 or 301); and —curing said material until obtaining the second part (29,129,129', 229 or 329) of the casing made of cured material.

Advantageously the curable material contacts the outer portion (17, 117, 117', 217 or 317) of at least one corresponding bearing device (13,113,113', 213, 313) and the interior (5, 105, 205 or 305) of the roller body (1, 101, 201 or 301).

According to a particularly preferred embodiment of the invention, the method may comprise:

—positioning at least the bearing means and its corresponding first part of the casing on a shaft (7,107 or 207) inside the roller body (1, 101 or 201);

—pouring a curable material in fluid state in a gap existing between the exterior (23,123,123' or 223) of the first part of the casing (19,119, 119' or 219) and the interior of the roller body (1,101 or 201); and —curing said material until obtaining the second part 29, 129, 129' or 229) of the casing made of cured material.

The aforesaid method is simple to carry out and, cheaper than the usual methods for manufacturing roller assembly.

The pouring and the curing steps may be carried out by any technique conventionally used in the art.

According to a more particularly preferred method according to the invention, the following steps may be carried out:

—positioning at least one pre-assembly resulting from the positioning of bearing means (especially bearing devices 13, 113, 113' or 213) and its corresponding first part (27, 127, 127' or 227) of the casing on a shaft (7, 107, or 207) inside the roller body (1, 101 or 201) and temporarily maintaining its spatial relation, by any appropriate means, with respect to the interior of the roller body (1,101 or 201);

—pouring a curable material in fluid state in a gap existing between the exterior (23,123,123' or 223) of the first part of the casing and the interior (5, 105 or of the roller body (1,101 or 201); and —curing said material until obtaining the second part (29, 129 or 229) of the casing made of cured material.

This method has the advantage to make very easy a pre-assembling comprising the shaft (7, 107 or 207), the bearing devices (13, 113 or 213) and the first part (27, 127, 127' or 227) of the casing with respect to the roller body (1,101 or 201).

This method can be further improved by the providing of an "O"-ring on the casing to temporarily maintain and coaxialally-position the shaft, the bearing means and the first part of the casing inside the roller body. Thus, the positioning step is much easier to carry out.

Advantageously the roller tube is positioned perpendicularly to the ground during all the steps involving the curing of the material to define the second part (29, 129, 129' or 229). This is a good and simple way to promote an homogenous pouring and subsequent curing of the materials following the gap. Advantageously, the pouring step may be carry out by the ends of the roller body.

Moreover other methods to fill the gaps existing between the interior of the roller tube and the first part of the casing may be used such as for exemple openings (such as opening 110) defining a filling channels provided trough the roller body. This method is very efficient to fill a corresponding gap. Furthermore it allows a simultaneous filling of several gaps of a same roller assembly and by the way increase the speed of the fabrication of the roller assembly.

The roller assembly according to the invention can be manufactured with any materials suitable but some kind of materials are preferred.

For the roller body, metals like iron, steel, cast iron or aluminium, rubber, polyurethane, epoxy resin, concrete, polymers or composite may be used. The bearing means and the shaft may be made of iron, steel, plastic or in composite.

The curable material having no shrinkage is advantageously selected from the group comprising rubber, polyurethane, epoxy resin, plastic, cast iron, aluminium and composite, well known to have the required properties As can be understood from the above description, the invention provides a novel roller assembly which offers the following advantages they can be manufactured with rollers having an internal diameter which is substantially greater than the external diameter of the shaft with bearing means fitted thereon and first part of the casing. Therefore, the the constituent parts of the roller assembly may be manufactured independently of each other. The manufacture of roller assemblies according to the invention is simple because it is not required to press-fit a roller body on a bearing device which is itself press fitted on a shaft. Then another advantage of this invention is to allow the use of a larger variety of material for defining the elements of the roller assembly.

What is claimed is:

1. In a roller assembly of the type comprising:
a roller body provided with opposed ends and with an interior;
a shaft having an outer surface;
bearing means comprising at least one bearing device having an inner portion and an outer portion, said bearing device having its inner portion coaxially mounted on the surface of the shaft; and
a casing having an exterior contacting a corresponding portion of the interior of the roller body and an interior contacting the outer portion of the corresponding bearing device; said casing comprising at least two coaxial parts, that is a first part and a second part, the first part having an interior and an exterior, the interior of said first part defining at least a portion of the interior of the casing and contacting the outer portion of the corresponding bearing device while substantially not contacting the shaft, the exterior of said first part having at least a portion thereof defining at least a portion of the exterior of the casing and contacting the interior of the roller body, and the second part having an interior and an exterior, the interior of the second part contacting a corresponding portion of the outer portion of the corresponding bearing device and/or a corresponding portion of the exterior of the first part and the exterior of the second part defining corresponding portion of the exterior of the casing and contacting the interior of the roller body; the improvement wherein said second part is made of a cured material contained in a gap existing between the outer portion of at least one corresponding bearing device and the interior of the roller body, said material having been introduced in said gap in a fluid state and cured "in situ" without any shrinkage.

2. A roller assembly according to claim 1, wherein the exterior of said first part contacts only the interior of the roller body and does not contact the interior of said second part of the casing.

3. In a roller assembly of the type comprising:
a roller body provided with opposed ends and with an interior;
a shaft having an outer surface;
bearing means comprising at least one bearing device having an inner portion and an outer portion; and
a casing for housing a corresponding bearing device and a portion of the shaft, said casing having an exterior contacting a corresponding portion of the interior of the roller body and an interior contacting the outer portion of the corresponding bearing device; said casing comprising at least two coaxial parts, that is a first part and a second part, the first part having an interior and an exterior, the interior of said first part defining at least a portion of the interior of the casing contacting the outer portion of the corresponding bearing device while substantially not contacting the shaft, and the second part having an interior and an exterior, the interior of said second part contacting the exterior of the first part, and the exterior of the second part defining at least a portion of the exterior of the casing and contacting the interior of the roller body; the improvement wherein said second part is made of a cured material contained in a gap existing between the exterior of the first part of the casing and the interior of the roller body, said material having been introduced in said gap in a fluid state and cured "in situ" without any shrinkage.

4. A roller assembly according to claim 3, wherein the cured material swells during its curing.

5. A roller assembly according to claim 3, wherein absorbing means are further provided between a portion of the exterior of the casing and a portion of the roller body.

6. A roller assembly according to claim 5, wherein said absorbing means comprise the second part of the casing.

7. A roller assembly according to claim 5, wherein each bearing device has an outer portion provided with an outer surface facing a corresponding portion of the interior of the roller body, and wherein absorbing means comprising a portion of the second part of the casing, are provided between said outer surface of the bearing device and said portion of the interior of the roller body.

8. A roller assembly according to claim 3, wherein between each end of the roller body and a neighboring bearing device, protecting means are respectively provided.

9. A roller assembly according to claim 8, wherein each protecting means comprise at least one labyrinth seal having a first and a second part, the first part being provided with an interior contacting the shaft and the second part defining a part of said first part of said casing; wherein a fluid packing is provided between said first and second part of the labyrinth seal; wherein said first part of the casing comprises a first, a second and third member, the second member being positional between said first and third members and being defined by the second part of the labyrinth seal; and wherein the first member of the casing is provided with at least one channel allowing a fluid communication between the labyrinth seal and the outside of the casing.

10. A roller assembly according to claim 3, wherein on at least the exterior of the first part of the casing, the interior of said roller body or at once the exterior of the first part of the casing and the interior of the roller body, means are provided for mechanically engaging it or them with the second part of the casing.

11. A roller assembly according to claim 10, wherein said means for mechanically engaging at least the exterior of the first part of the casing , the interior of said roller body or at once the exterior of the first part of the casing and the interior of the roller body, with the second part of the casing, are of the type tongue and groove assembly.

12. A roller assembly according to claim 9, wherein said is further provided with positioning means for co-axial mounting of the shaft in the roller body.

13. A roller assembly according to claim 12, wherein said positioning means are part of the first part of the casing and further define means for retaining the fluid material to be cured in the gap existing between the first part of the casing and the interior of the roller body.

14. A roller assembly according to claim 3, wherein two bearing devices are respectively provided near each of said ends of the roller body, each bearing device comprising a sleeve of antifriction material having an inner portion and an outer portion corresponding to those of the bearing device.

15. A roller assembly according to claim 3, wherein two bearing devices are respectively provided near each of said ends of the roller body, wherein at least one other bearing device is further provided between those already provided near each of said ends, each bearing device comprising a sleeve of antifriction material having an inner portion and an outer portion corresponding to those of the bearing device.

16. A roller assembly according to claim 3, wherein two bearing devices are respectively provided near each of said ends of the roller body, each bearing device comprising at least one roller bearing provided with an inner race defining the inner portion of the bearing device and an outer race defining the outer portion of said bearing device.

17. A roller assembly according to claim 3, wherein two bearing device are respectively provide near each of said ends of the roller body, wherein at least another bearing device is further provided between those already provided near each of said ends, and wherein each of said bearing device comprises at least one roller bearing provided with an inner race defining the inner portion of the bearing device and an outer race defining the outer portion of said bearing device.

18. In a roller assembly of the type comprising:
a roller tube provided with opposed ends and with an interior;
a shaft having an outer surface and provided with two shoulders;
bearing means comprising at least two bearing devices that are respectively provided near each of said ends of the roller tube, each of said bearing device comprising at least one roller bearing provided with an inner race defining an inner portion of the bearing device and an outer race defining an outer portion of said bearing device; each bearing device being laterally abutted against a corresponding shoulder of the shaft;

a casing for housing a corresponding bearing device and a portion of the shaft, said casing having an exterior contacting a corresponding portion of the interior of the roller tube and an interior contacting the outer portion of the bearing device; said casing comprising at least two coaxial parts, that is a first part and a second part, the first part having an interior and an exterior, the interior of said first part defining at least a portion of the interior of the casing contacting the outer portion of the corresponding bearing device while substantially not contacting the shaft, and the second part having an interior and an exterior, the interior of said second part contacting the exterior of the first part, and the exterior of the second part defining at least a portion of the exterior of the casing and contacting the interior of the roller tube; said first part of the casing comprising a first, a second and a third members, the second member being positioned between said first and third members, the first member being positioned toward the closer end of the roller tube;

—protecting means for the roller bearing inside each casing once mounted on the shaft, said protecting means comprising:

—a labyrinth seal having a first and a second parts, the first part being provided with an interior contacting the shaft and the second part having a portion defining a part of said first part of said casing, and having a grease or a high viscosity heat resistant lubricant between said first and second parts of the labyrinth seal; said first member being further provided with a channel allowing a fluid communication between the labyrinth seal and the outside of the casing; and —means for further protecting the bearing device comprising an "O"-ring positioned near the end of contacting the exterior of the first member casing and the shaft;

—means for positioning and retaining the shaft coaxial with the roller tube and comprising an "O"-ring defining a part of the exterior of the third member and contacting the interior of the roller tube; the improvement wherein said second part is made of a cured material filling a gap existing between the exterior of the first part of the casing and the interior of the roller tube, said material having been introduced in said gap in a fluid state and cured "in situ" without any shrinkage, said cured material having such properties to define absorpbing means between the first part of the casing and the interior of the roller tube.

19. A roller assembly according to claim 18, wherein on at least the exterior of the first part of the casing, the interior of said roller tube or at once the exterior of the first part of the casing and the interior of the roller tube, means comprising tongue and groove are provided for mechanically engaging it or them with the second part of the casing.

20. A roller assembly according to claim 18, wherein the bearing means comprise two bearing device are respectively provide near each of said ends of the roller body, wherein at least another bearing device is further provided between those already provided near each of said ends, and wherein each of said bearing device comprises at least one roller bearing provided with an inner race defining the inner portion of the bearing device and an outer race defining the outer portion of said bearing device.

21. In a roller assembly of the type comprising:

a roller tube provided with opposed ends and with an interior;

a shaft having an outer surface and provided with four shoulders;

bearing means comprising at least two bearing devices having an inner portion and an outer portion, two of said being devices being respectively provided near each of said ends of the roller tube, each of said bearing means comprising a sleeve made of antifriction material, each bearing device being laterally abutted against a corresponding shoulder of the shaft;

a casing for housing a corresponding bearing device and a portion of the shaft, said casing having an exterior contacting a corresponding portion of the interior of the roller tube and an interior contacting the outer portion of the bearing device; said casing comprising at least two coaxial parts, that is a first part and a second part, the first part having an interior and an exterior, the interior of said first part defining at least a portion of the interior of the casing contacting the outer portion of the corresponding bearing device while substantially not contacting the shaft, and the second part having an interior and an exterior, the interior of said second part contacting the exterior of the first part, and the exterior of the second part defining at least a portion of the exterior of the casing and contacting the interior of the roller tube; said first part of the casing comprising a first, a second and a third members, the second member being positioned between said first and third members, the first member being positioned toward the closer end of the roller tube;

—protecting means for the bearing device inside each casing once mounted on the shaft, said protecting means comprising:

—a labyrinth seal having a first and a second parts, the first part being provided with an interior contacting the shaft and abutting against an other shoulder of said shaft, while the second part having a portion defining a part of said first part of said casing, and having a grease or a high viscosity heat resistant lubricant is provide between said first and second parts of the labyrinth seal, said first member of the casing being further provided with a channel allowing a fluid communication between the labyrinth seal and the outside of the casing; and —means for further protecting the corresponding bearing device comprising an "O"-ring positioned near the end of the roller tube and contacting the exterior of the first member and the shaft;

—means for positioning and retaining the shaft coaxial with the roller tube and comprising an "O"-ring positioned near the opposite end of the casing, defining the exterior of the first part of the casing and contacting the interior of the roller tube;

the improvement wherein said second part is made of a cured material filling a gap existing between the exterior of the first part of the casing and the interior of the roller tube, said material having been introduced in said gap in a fluid state and cured "in situ" without shrinkage, said cured material having such properties to define absorbing means between the first part of the casing and the interior of the roller tube.

22. A roller assembly according to claim 21, wherein on at least the exterior of the first part of the casing, the interior of said roller tube or at once the exterior of the first part of the casing and the interior of the roller tube, means comprising tongue and groove are provided for mechanically engaging it or them with the second part of the casing.

23. A roller assembly according to claim 21, wherein two bearing devices are respectively provided near each of said ends of the roller body, wherein and at least one other bearing device further provided between those already provided near each of said ends, each bearing device comprising a sleeve of antifriction material having an inner portion and an outer portion corresponding to those of the bearing device.

24. Method for manufacturing a roller assembly, the assembly being comprised of a roller body provided with opposed ends and with an interior;
 a shaft having an outer surface;
 bearing means comprising at least one bearing device having an inner portion and an outer portion, said bearing device having its inner portion coaxially mounted on the surface of the shaft; and
 a casing having an exterior contacting a corresponding portion of the interior of the roller body and an interior contacting the outer portion of the corresponding bearing device;
 the casing further having at least two coaxial parts, that is a first part and a second part, the first part having an interior and an exterior, the interior of said first part defining at least a portion of the interior of the casing and contacting the outer portion of the corresponding bearing device while substantially not contacting the shaft, the exterior of said first part having at least a portion thereof defining at least a portion of the exterior of the casing and contacting the interior of the roller body, and the second part having an interior and an exterior, the interior of the second part contacting a corresponding portion of the outer portion of the corresponding bearing device and/or a corresponding portion of the exterior of the first part and the exterior of the second part defining a corresponding portion of the exterior of the casing and contacting the interior of the roller body;
 the method comprising the steps of
 pouring a curable material in a fluid state in a gap existing between the outer portion of at least a bearing device and the interior of the roller body; and
 curing said material in situ to form the second part of the casing.

25. Method for manufacturing a roller assembly, the assembly being comprised of a roller body provided with opposed ends and with an interior,
 a shaft having an outer surface;
 bearing means comprising at least one bearing device having an inner portion and an outer portion; and
 a casing for housing a corresponding bearing device and a portion of the shaft, said casing having an exterior contacting a corresponding portion of the interior of the roller body and an interior contacting the outer portion of the corresponding bearing device;
 said casing comprising at least two coaxial parts, that is a first part and a second part, the first part having an interior and an exterior, the interior of said first part defining at least a portion of the interior of the casing contacting the outer portion of the corresponding bearing device while substantially not contacting the shaft, and the second part having an interior and an exterior, the interior of said second part contacting the exterior of the first part, and the exterior of the second part defining at least a portion of the exterior of the casing and contacting the interior of the roller body;
 the method comprising the steps of
 pouring a curable material in a fluid state in a gap existing between the outer portion of at least a bearing device and the interior of the roller body; and
 curing said material in situ to form the second part of the casing.

26. Method for manufacturing a roller assembly, the assembly being comprised of a roller body provided with opposed ends and with an interior,
 a shaft having an outer surface;
 bearing means comprising at least one bearing device having an inner portion and an outer portion; and
 a casing for housing a corresponding bearing device and a portion of the shaft, said casing having an exterior contacting a corresponding portion of the interior of the roller body and an interior contacting the outer portion of the corresponding bearing device;
 said casing comprising at least two coaxial parts, that is a first part and a second part, the first part having an interior and an exterior, the interior of said first part defining at least a portion of the interior of the casing contacting the outer portion of the corresponding bearing device while substantially not contacting the shaft, and the second part having an interior and an exterior, the interior of said second part contacting the exterior of the first part, and the exterior of the second part defining at least a portion of the exterior of the casing and contacting the interior of the roller body;
 the method comprising the steps of
 vertically positioning at least one preassembly resulting from positioning of at least one bearing device and its corresponding first part of the casing on a shaft inside the roller body and temporarily maintaining its spatial relation with respect to the interior of the roller body;
 pouring a curable material in a fluid state in a gap existing between the exterior of the first part of the casing and the interior of the roller body; and
 curing said material in situ to form the second part of the casing made of cured material.

27. Method for manufacturing the roller assembly according to claim 26, wherein the pouring step is carried out by the upper end of the roller body.

28. Method for manufacturing the roller assembly according to claim 26, wherein the pouring step is further carried out by means of filling channels provided in the roller body.

29. Method for manufacturing a roller assembly, the assembly being comprised of a roller body provided with opposed ends and with an interior,
 a shaft having an outer surface;
 bearing means comprising at least one bearing device having an inner portion and an outer portion; and
 a casing for housing a corresponding bearing device and a portion of the shaft, said casing having an exterior contacting a corresponding portion of the interior of the roller body and an interior contacting the outer portion of the corresponding bearing device;

said casing comprising at least two coaxial parts, that is a first part and a second part, the first part having an interior and an exterior, the interior of said first part defining at least a portion of the interior of the casing contacting the outer portion of the corresponding bearing device while substantially not contacting the shaft, and the second part having an interior and an exterior, the interior of said second part contacting the exterior of the first part, and the exterior of the second part defining at least a portion of the exterior of the casing and contacting the interior of the roller body; and two bearing devices are respectively provided near each of said ends of the roller body, each bearing device comprising a sleeve of antifriction material having an inner portion and an outer portion corresponding to those of the bearing device;

the method comprising the following steps is carried out successively for both the bearing devices respectively provided near each end of the roller body:

vertically positioning through an upper end of the roller body a first pre-assembly resulting from the positioning of one of the bearing devices and its corresponding first part of the casing on a shaft inside the roller body, and temporarily maintaining its spatial relation with respect to the interior of the roller body;

pouring a curable material in a fluid state in a gap existing between the exterior of the first part of the casing and the interior of the roller body;

curing said material in situ to form the second part of the casing;

turning the roller assembly upside down; and repeating the above steps at the opposite end of the roller body.

30. Method for manufacturing the roller assembly according to claim 29, wherein the pouring step is carried out by the upper end of the roller body.

31. Method for manufacturing a roller assembly, the assembly being comprised of a roller body provided with opposed ends and with an interior, a shaft having an outer surface;

bearing means comprising at least one bearing device having an inner portion and an outer portion; and a casing for housing a corresponding bearing device and a portion of the shaft, said casing having an exterior contacting a corresponding portion of the interior of the roller body and an interior contacting the outer portion of the corresponding bearing device;

said casing comprising at least two coaxial parts, that is a first part and a second part, the first part having an interior and an exterior, the interior of said first part defining at least a portion of the interior of the casing contacting the outer portion of the corresponding bearing device while substantially not contacting the shaft, and the second part having an interior and an exterior, the interior of said second part contacting the exterior of the first part, and the exterior of the second part defining at least a portion of the exterior of the casing and contacting the interior of the roller body;

two bearing devices are respectively provided near each of said ends of the roller body, each bearing device comprising at least one roller bearing provided with an inner race defining the inner portion of the bearing device and an outer race defining the outer portion of said bearing device;

the method comprising the following steps is carried out successively for both the bearing devices respectively provided near each end of the roller body:

vertically positioning through an upper end of the roller body a first pre-assembly resulting from the positioning of one of the bearing devices and its corresponding first part of the casing on a shaft inside the roller body, and temporarily maintaining its spatial relation with respect to the interior of the roller body;

pouring a curable material in a fluid state in a gap existing between the exterior of the first part of the casing and the interior of the roller body;

curing said material in situ to form the second part of the casing;

turning the roller assembly upside down; and repeating the above steps at the opposite end of the roller body.

32. Method for manufacturing the roller assembly according to claim 31, wherein the pouring step is carried out by the upper end of the roller body.

* * * * *